United States Patent [19]

Wilson

[11] Patent Number: 5,347,588
[45] Date of Patent: Sep. 13, 1994

[54] METHOD AND APPARATUS FOR VIDEO IMAGING OF TIRE GROUND CONTACT PATCH

[75] Inventor: Paul B. Wilson, Tallmadge, Ohio

[73] Assignee: Bridgesteon Corporation, Tokyo, Japan

[21] Appl. No.: 776,527

[22] Filed: Oct. 11, 1991

[51] Int. Cl.$^5$ .................. G06K 9/36; G01M 17/00
[52] U.S. Cl. ................................ 382/1; 382/55; 382/49; 73/146
[58] Field of Search ............ 382/1, 28, 55, 41, 49; 358/107; 356/376, 379; 73/146

[56] References Cited

U.S. PATENT DOCUMENTS

| | | | |
|---|---|---|---|
| 4,095,464 | 6/1978 | Breedijk | 73/146 |
| 4,866,785 | 9/1989 | Shibano | 382/51 |
| 4,963,035 | 10/1990 | McCarthy et al. | 382/28 |
| 4,975,972 | 12/1990 | Bose et al. | 382/51 |

OTHER PUBLICATIONS

Serra, "Image Analysis and Mathematical Marphology", 1982 pp. 43–55.
Jansen et al. "Analysis of Hydroplaning Photos Using an Image Analyzer" International Congress & Exposition-Society of Automotive Engineers, 1986, pp. 1–5.
"Robotics Age," Fall 1980, pp. 22–28; Robot Vision For Industry: The Autovision System by Reinhold and Vanderburg
"Society of Automotive Engineers," 1986, Analysis of Hydroplaning Photos Using an Image Analyzer by Lawrence G. Jansen; Abstract only.

Primary Examiner—Leo H. Boudreau
Assistant Examiner—Larry J. Prikockis
Attorney, Agent, or Firm—David A. Thomas

[57] ABSTRACT

A method and apparatus for video imaging of a tire ground contact patch or tire footprint is presented. A digitized image of the footprint is generated as an array of pixels. Each pixel is attributed a binary value of one or zero, to present a two-valued image. Contact areas within the image are attributed a first value, while void or noncontact areas are attributed a second value. The image is then dilated and eroded in an appropriate sequence to eliminate all white pixels from the image and to eliminate surface anomalies or the like which are not of interest in the tire analysis. An image of the footprint, accurate in size and dimensions, is thereby generated and, from such footprint, total area, contact area, and void area can be determined, as well as measurements of width, center line length, and other desired lengths at various lateral width locations. This data may be used to analyze the tire construction, operation, noise generation, and performance.

11 Claims, 4 Drawing Sheets

METHOD AND APPARATUS FOR VIDEO IMAGING OF TIRE GROUND CONTACT PATCH

TECHNICAL FIELD

The invention herein resides in the art of the manufacture and testing of pneumatic tires. More particularly, the invention relates to a method and apparatus for acquiring and analyzing a tire contact patch or tire footprint. Specifically, the invention relates to a method and apparatus for acquiring and digitally analyzing various geometric and arithmetic features of a tire footprint.

BACKGROUND ART

It is well known that many characteristics or features of a tire may impact its performance, wear, noise generation, and the like. Over the years, various types of analyses have been performed on tires. There has been the monitoring of the actual physical operation of the tire as upon a rotating drum or the like. Analytical testing of external and cross sectional features of the tire have also been undertaken.. More recently, it has been known to analyze the contact patch or footprint of the tire as it makes contact with road or loading surface to determine therefrom various structural and operational characteristics thereof. Those skilled in the art understand that a tire footprint constitutes the image of the tire imparted upon a planar contact surface when the tire is inflated to a set pressure and receives a predetermined load.

In the prior art, such tire footprints were generally analyzed manually. In one such method, ink was applied to the tire surface which was then loaded onto a planar substrate such that the ink would be transferred from the tire to the substrate. In most instances, the substrate constituted paper or another suitable thin sheet material. The image of the tread and other contact areas of the tire would dry upon the paper, at which time the areas of the substrate having ink thereon would be cut out of the substrate and weighed. In similar manner, the uninked area portions of the substrate would also be weighed. A comparison of the two weights would provide the ratio of the tread or contact areas to the void areas of the footprint image. It was also known that the inked footprint image could also be used to physically measure the footprint width, and to similarly measure the individual rib lengths of the footprint. The length relationships of the several ribs can then be compared and the general shape of the footprint can be characterized.

The prior art technique for footprint analysis was labor intensive and prone to error. The significant implementation of human participation in measurements, calculations, and decisive judgment gave rise to inconsistencies and errors in the analysis. Accordingly, there is a need in the art for a method and apparatus for video imaging of tire footprints which provides a wide range of data, which is based upon a digital data analysis, and which allows for computerized calculation of the footprint shape data.

DISCLOSURE OF INVENTION

In light of the foregoing, it is a first aspect of the invention to provide a method and apparatus for video imaging of a tire footprint in which the tire footprint image is digitized.

Another aspect of the invention is the provision of a method and apparatus for video imaging of a tire footprint which quickly and automatically measures the footprint contact area, determines the entire footprint area, and therefrom accurately calculates the void area. Thus, the total footprint area is comprised of the contact area of the tread elements plus all void regions lying between areas of contact.

Still a further aspect of the invention is the provision of a method and apparatus for video imaging of a tire footprint in which the width, center line length, and lengths at various positions across the width of the footprint can be quickly determined.

Still a further aspect of the invention is the provision of a method and apparatus for video imaging of a tire footprint which may be employed to quickly calculate tire parameters which are known to impact tire wear, noise, performance, and the like.

The foregoing and other aspects of the invention which will become apparent as the detailed description proceeds are achieved by an apparatus for video imaging a tire footprint, comprising: first means for generating a tire footprint upon a planar surface; second means for generating a digitized video image of said footprint from said planar surfaces, said digitized video image having contact regions corresponding to tire tread elements, and void regions corresponding to regions between the tread elements; third means for receiving said digitized video image and determining the area of said contact regions within said footprint; and fourth means for receiving said digitized video image and determining the total area of said footprint.

Other aspects of the invention which will become apparent herein are obtained by a method of video imaging a footprint of a tire, comprising the steps of: (a) generating a footprint of a tire upon the planar surface; (b) generating a digitized video image of said footprint from said planar surface, said digitized video image comprising an array of pixels, regions in said digitized video image corresponding to tread being attributed a first value, and regions in said digitized video image corresponding to void areas being attributed a second value; (c) summing the total value of all pixels having said first value, thereby determining a tread area; (d) determining the total area of said footprint; and (e) subtracting said tread area from said total area, thereby determining a void area.

DESCRIPTION OF DRAWINGS

For a complete understanding of the objects, techniques and structure of the invention reference should be made to the following detailed description and accompanying drawings wherein.

BEST MODE FOR CARRYING OUT THE INVENTION

Figure 1:
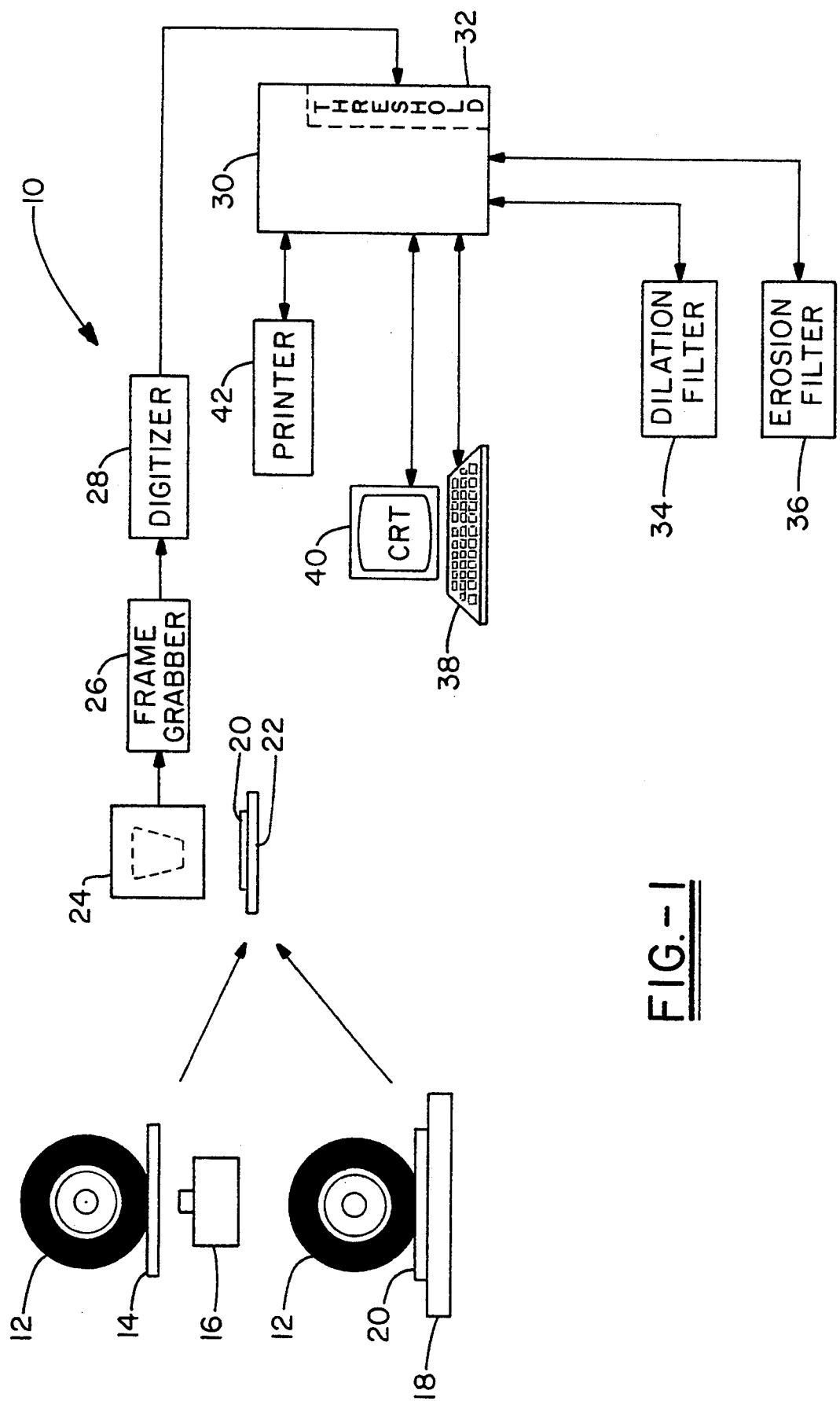
FIG. 1 is a schematic block diagram of the apparatus of the invention.

Referring now to the drawings and more particularly FIG. 1, it can be seen that a system for video imaging a tire footprint is designated generally by the numeral 10. As shown, a pneumatic tire 12 is introduced into the system 10 for the purpose of providing a footprint image to be analyzed. According to one embodiment of the invention, the tire 12 may be inflated to a known pressure and placed under a fixed load upon a glass or other transparent plate 14. A camera 16 or other suitable means for receiving a print may be placed on a side of the plate 14 opposite the tire 12 to obtain a photographic print, transparency, or other suitable image of the tire footprint. Again, it will be appreciated by those skilled in the art that the tire footprint is that contact portion of the tire with a planar surface when the tire is inflated to a specific pressure and placed under a known load. In another embodiment of the invention, the tire tread portion is inked and brought down upon an appropriate mat or substrate 20 received upon a support plate 18. In a preferred embodiment of the invention, the substrate 20 comprises a piece of cardboard, paper, or other appropriate medium.

While the tire footprint is generated upon a planar surface according to preferred embodiments of the invention, those skilled in the art will readily appreciate that a suitable footprint image may also be generated against a curved surface such as a drum or the like. In any event, the footprint image is generated by statically loading the tire on an appropriate surface.

Irrespective of the method used for obtaining an image of the tire footprint, that image is passed to a plate 22 maintained under an illumination source 24. For purposes of discussion, it will be assumed that the mat or substrate 20 has been so placed.

A frame grabber or suitable video imaging device 26 may be provided as part and parcel of the illumination source 24 or otherwise in communication with the substrate 20 received upon the plate 22. The frame grabber 26 is employed to seize and maintain a single frame of the footprint image as the same is carried upon the substrate 20. A digitizer 28 receives the video frame and digitizes the same in a manner well known and understood by those skilled in the art. Suffice it to say that the digitizer 28 generates an array of picture elements or "pixels", each being digitized to its appropriate gray level. In other words, each pixel has attributed thereto a specific binary number which is tailored to a "gray scale" indicating the grey level of that pixel from all white to all black. The resolution of the system will, of course, be dependent upon the number of binary bits attributed to each pixel. Where eight bits are provided for each pixel, it will be understood that each pixel can be attributed one of two hundred fifty six weighted grey level values. Accordingly, the output of the digitizer 26 is a digitized pixel array of the footprint image carried by the substrate 20.

Those skilled in the art will readily appreciate that the frame grabber 26 and digitizer 28 may comprise a single unit or vidicon as is presently well known and understood by those skilled in the art.

The digitized image from the digitizer 28 is passed to an appropriate microprocessor or other digital processing unit 30. As a portion of the microprocessor 30, a threshold circuit 32 is provided. It will, of course, be understood that the threshold 32 may comprise either hardware or software as the same would be appreciated in the art. In any event, the threshold circuit 32 or threshold process is employed to generate a "black" and "white" image or a two value image from the grey scale image output of the digitizer 28. A threshold is set such that any pixel having a digitized value which is equal to or exceeding the threshold level will be attributed the binary value "one," corresponding to black, and the remaining pixels having a value less than such threshold will be attributed the binary value of "zero," being white. Accordingly, a binary image of pure black and white pixels corresponding to the footprint has been generated.

Also communicating with the microprocessor 30 is a dilation filter 34. Again, the dilation filter 34 can be hardware, software, or a combination of the two as will be appreciated by those skilled in the art. The dilation filter operates in known fashion upon each pixel of the black and white threshold image. The dilation filter considers the pixel of interest and each of the eight pixels contiguous thereto. In other words, the dilation filter 34 looks at a 3×3 pixel matrix, with the center pixel being the pixel of interest. In its operational mode, the dilation filter 34 sets the pixel of interest at a value of "one" (black) if any of the pixels in its matrix or in juxtaposition to it are "one" (black). Accordingly, the black portion of the image expands, hence the name "dilation filter."

Also provided in communication with the microprocessor 30 is an erosion filter 36. In like manner, the erosion filter 36 considers a 3×3 matrix of pixels, with the center pixel being the one of interest. The erosion filter operates on somewhat the same principal as the dilation filter, but seeks to set the pixel of interest to "zero" (white) if any of the adjacent pixels are "zero" (white). Accordingly, the erosion filter 36 seeks to shrink or erode the total image.

Those skilled in the art will appreciate that the dilation filter 34 allows the pixel of interest to remain black if it is the only black pixel within the matrix, similarly the erosion filter 36 allows the pixel of interest to remain white if it is the only white pixel in the matrix.

Also provided as a part of the system 10 and in communication with the microprocessor 30 is a keyboard 38 allowing an operator to communicate with the microprocessor. In like manner, an appropriate display screen or monitor 40 is also provided in communication with the microprocessor 30, as is a printer 42. Those skilled in the art will appreciate that communications between the microprocessor 30 and the operator are achieved using the peripheral equipment 3 8, 40 and 42.

Figure 2:
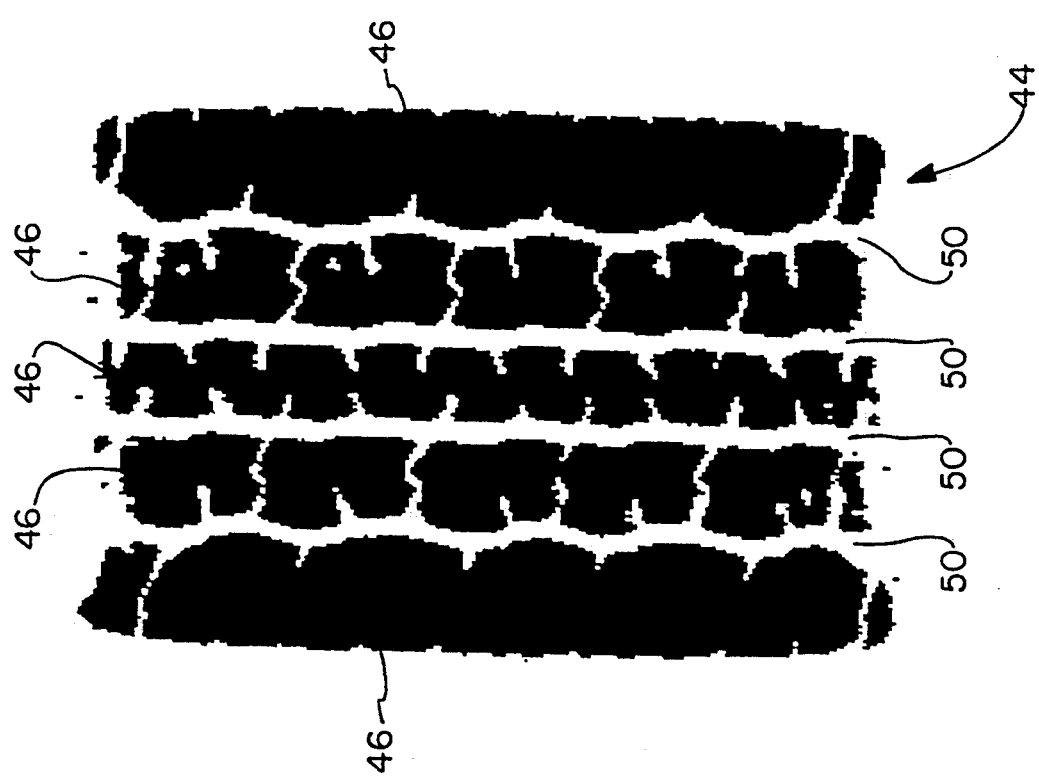
FIG. 2 is a digitized image of a tire footprint, the same having been established in a two value system.

With reference now to FIG. 2, an appreciation of a digitized image 44 of a tire footprint can be seen. The image 44 would be of the type generated from a grey level digitized image received from the digitizer 28 and operated upon by the threshold circuit 32. It will be seen that each of the pixels of the digitized image 44 is either black (1) or white (0). The contact areas of the tire footprint is made up of a plurality of tread elements 46 and are shown in black, while the groove or void areas 50, typically between the tread elements 46, are white.

It will be readily appreciated that the digitized image 44 of the footprint can be readily employed to calculate the total contact area of the tire footprint. With each pixel representing a fixed geometric area of the image, the microprocessor 30 need only sum those pixels having a digitized value of "one" to determine the total contact area.

Figure 3:
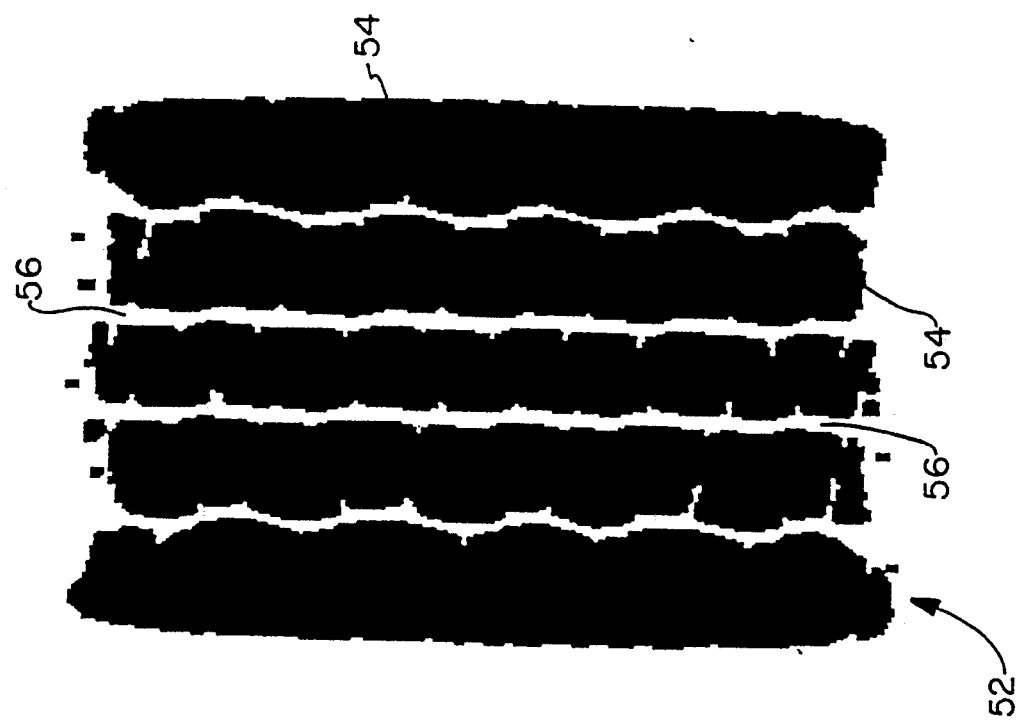
FIG. 3 is an illustration of the footprint of FIG. 2 after a first dilation.
Figure 4:
FIG. 4 is an illustration of the footprint image of FIG. 2, fully dilated after a fourth dilation.

In order to find the total area of the footprint image, a process of dilating and eroding the image 44 of FIG. 2 is undertaken. First, the image 44 is dilated the number of times necessary to eliminate all white pixels within the footprint area. As shown in FIG. 3, the image 52 corresponds to the image 44, dilated once. It will be quickly observed that the black contact areas 54 are greatly expanded or dilated, while the white void areas 56 are significantly reduced. The dilation process continues until, as shown in FIG. 4, a fully dilated image 58 is attained. In the process of dilating the particular image of FIG. 2, four such dilation processes are required. It will be appreciated that the dilated image 58 has no white pixels within the confines of the footprint image. It will further be appreciated that the footprint image 58 constitutes a total array of black pixels maintained within a black border. Finally, those skilled in the art will readily understand that the perimeter of the footprint image was expanded during the dilation process an extent which was a direct linear function of the number of dilations undertaken.

Figure 5:
FIG. 5 is an illustration of the dilated footprint image of FIG. 4 after a second erosion thereof.

The fully dilated footprint image 58 is next subjected to an erosion filter to shrink down the size or perimeter of the footprint image to be equal to the natural footprint image before the dilation process. As shown in FIG. 5, the image 60 corresponds to the image 58 in FIG. 4, but after having been eroded twice. It will be readily appreciated that the perimeter features of the footprint have been eroded or reduced.

Figure 6:
FIG. 6 is an illustration of the dilated image of FIG. 4 after a fourth erosion thereof.
Figure 8:
FIG. 8 is an illustration of the footprint image of FIG. 7 having been dilated once from FIG. 7.
Figure 7:
FIG. 7 is an illustration of the dilated image of FIG. 4 after said image has been eroded one more time than it was dilated in FIG. 4.

FIG. 6, shows a footprint image 62, corresponding to the fully dilated footprint image 50 which has been eroded the same number of times that the image 58 was dilated. It will be seen that protrusions or "whiskers" 64 extend from tread area portions of the image 62. It has been found that these protrusions or whiskers 64 are the whiskers on the tire which result from rubber filling the vent pin holes in the tire mold. Since these features quickly disappear upon use of the tire, and since they do not contribute to the operational or structural features of the tire, it is desired that the same be removed from the footprint image. To achieve this, one more erosion operation is undertaken as shown in FIG. 7. Here, the image 66 has been eroded one more time than the original print image of FIG. 2 was dilated. The result is an elimination of the whiskers 64. However, to force the footprint image to attain a proper and accurate dimensional configuration, the image must now be dilated one more time. After this operation, the final footprint image 68 is attained as shown in FIG. 8. Those skilled in the art will understand that the footprint image 68 represents the actual physical size of the total footprint 44 of FIG. 2, for the total number of dilations is equal to the total number of erosions. The footprint 68 is comprised solely of black pixels. Accordingly, the area of the total footprint can be easily attained by summing the number of black pixels within the image 68. Having achieved this total, not only is the footprint area known, but by subtracting the contact area obtained from the image 44 of FIG. 2 therefrom, the total of the void areas 50 can readily be determined.

Figure 9:
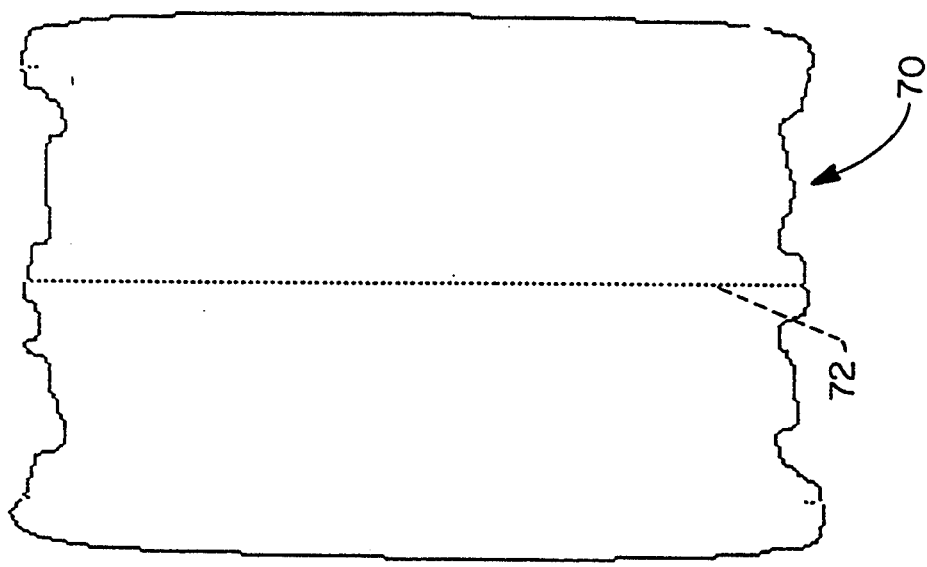
FIG. 9 is an outline contour of the tire footprint obtained from FIG. 8 showing center line and shoulder ribs thereon.

The image 68 of FIG. 8 can be readily employed to generate a contour or outline of the footprint image, the result being designated by the numeral 70 in FIG. 9. It will be appreciated that the microprocessor 30 is employed to generate the contour 70 by simply interconnecting the centers of the outermost pixels of the image 68. The microprocessor 30 may also be employed in this regard to smooth the contour of the image by appropriate weighting and buffering of the x-y coordinates of each of the pixels. Sharp edges and transitions may thereby be smoothed or eliminated.

With the contour 70 having been so generated, other important information regarding the footprint can be attained. The width of the footprint can, of course, be readily determined by the microprocessor 30. A center line 72 may be generated equidistant between the side portions of the footprint. In like manner, footprint lengths at various lateral width points may also be determined. With the contour of the footprint now being defined, various desired values and characterizations of the shape can be generated which are known to be indicative or characteristic of tire wear, operation, noise, and performance.

Thus it can be seen that the objects of the invention have been satisfied by the structure presented above. While in accordance with the patent statutes only the best mode and preferred embodiment of the invention has been presented and described in detail, it is to be understood the invention is not limited thereto or thereby. Accordingly, for an appreciation of the true scope and breadth of the invention reference should be made to the following claims.

What is claimed is:

1. Apparatus for video imaging the interface area between a tire and its contacting loading surface, also known as a tire footprint, comprising:

first means for generating a tire footprint upon a surface;

second means for generating a digitized video image of said footprint from said surface, said digitized video image comprising an array of pixels and having contact regions corresponding to tire tread elements, and void regions corresponding to regions between the tread elements;

third means for receiving said digitized video image and determining the area of said contact regions within said footprint image; and fourth means for receiving said digitized video image and determining the area and boundary contour of said footprint image, said fourth means comprising a dilation filter, and an erosion filter, said dilation filter filtering said digitized video image a first number of times until all pixels within a region encompassed by the contour of the footprint are of a same value and said video image is a dilated image, said erosion filter receiving said dilated image and filtering said dilated image said first number of times plus an additional time, generating an eroded image, said dilation filter subsequently filtering said eroded image one additional time, generating a uniform footprint image wherein all pixels comprising the uniform footprint image are at equal value.

2. The apparatus according to claim 1, wherein said uniform footprint image is encompassed by a uniform footprint contour.

3. The apparatus according to claim 2, wherein said third means determines an area of said contact regions by summing all pixels within said contact regions and said fourth means determines said total area of said footprint by summing all pixels within said uniform footprint contour.

4. The apparatus according to claim 3, wherein said fourth means further determines an area of said void regions by subtracting the sum of pixels within said contact regions from the sum of pixels within said uniform footprint contour.

5. The apparatus according to claim 4, wherein said fourth means further determines a width of said uniform footprinted contour.

6. The apparatus according to claim 5, wherein said fourth means further determines a length of said uniform footprint contour along a longitudinal centerline and various lateral width locations thereof.

7. A method for video imaging the interface area between a tire and its contacting loading surface, also known as a tire footprint, comprising the steps of:

(a) generating a footprint of a tire upon a planar surface;

(b) generating a digitized video image of said footprint from said planar surface, said digitized video image comprising an array of pixels, regions in said digitized video image corresponding to tread elements being attributed a first value, and regions in said digitized video image corresponding to void areas being attributed a second value;

(c) summing the total value of all pixels having said first value, thereby determining a tread contact area;

dilating said array of pixels a first number of times until no pixels of said second value remain within the region encompassed by a contour of the footprint, thereby generating a dilated pixel array, eroding said dilated pixel array a second number of times, generating an eroded pixel array, said second number being one greater than said first number, dilating said eroded pixel array one time, generating a uniform footprint contour, and determining the area of said footprint within said uniform footprint contour; and (e) subtracting said tread contact area from said area of said footprint, thereby determining a void area.

8. The method according to claim 7, further comprising the step of determining a width of said uniform footprint contour.

9. The method according to claim 8, further comprising the step of determining length of a longitudinal center line of said uniform footprint contour.

10. The method according to claim 9, further comprising the step of determining tire footprint lengths at various lateral width locations.

11. The method according to claim 10, wherein step (d) comprises characterization of a shape of the tire footprint.

* * * * *